W. P. EVANS.
AUTOMATIC AUTOMOBILE JACK.
APPLICATION FILED DEC. 4, 1915.
1,214,024.
Patented Jan. 30, 1917.
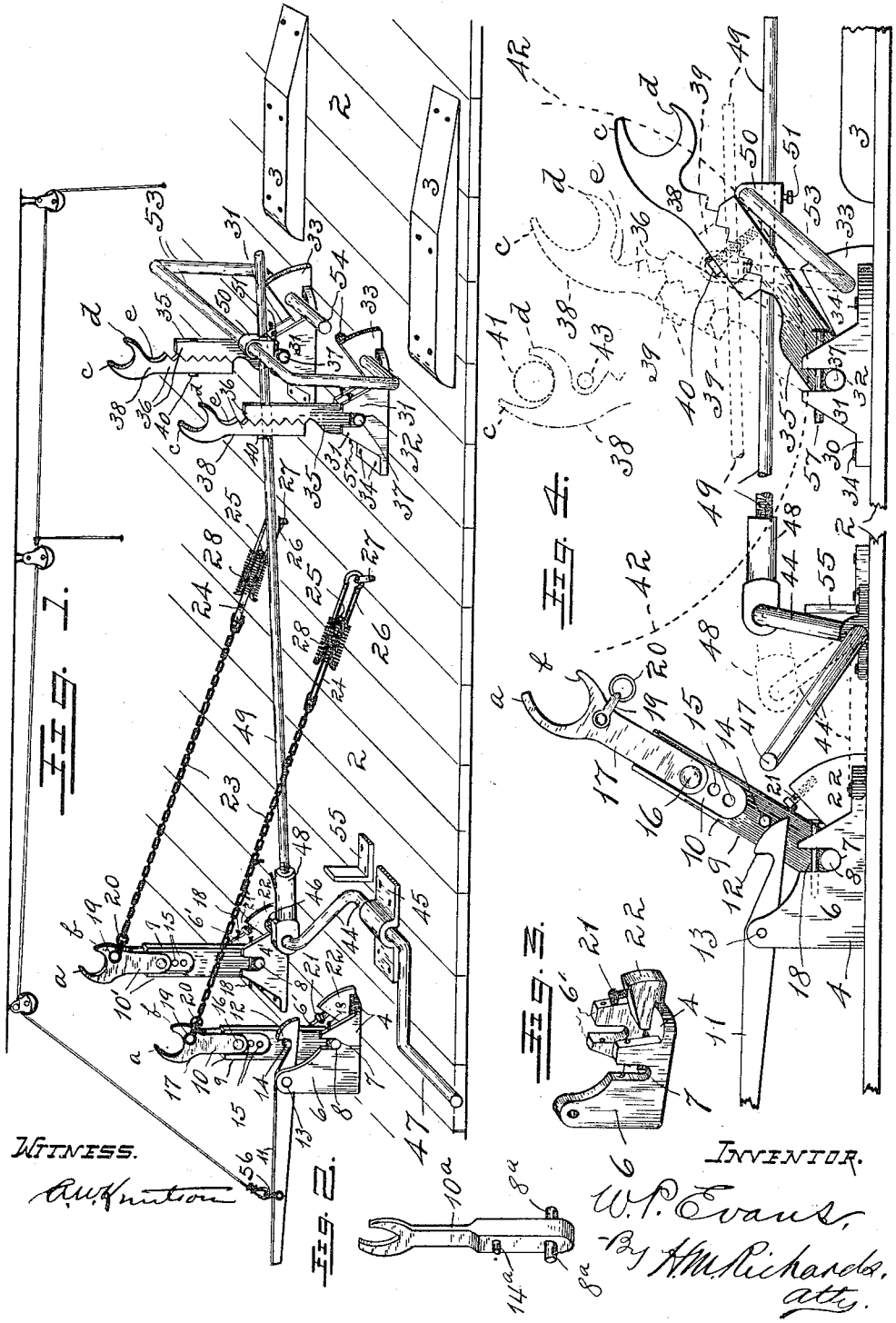

UNITED STATES PATENT OFFICE.

WALTER P. EVANS, OF DES MOINES, IOWA, ASSIGNOR, BY DIRECT AND MESNE ASSIGNMENTS, OF ONE-FOURTH TO WENZELMANN MFG. CO., OF GALESBURG, ILLINOIS, A CORPORATION OF ILLINOIS, AND ONE-FOURTH TO E. C. BOMAR AND ONE-FOURTH TO REES DAVIES, BOTH OF CLAY CENTER, KANSAS.

AUTOMATIC AUTOMOBILE-JACK.

1,214,024.     Specification of Letters Patent.     Patented Jan. 30, 1917.

Application filed December 4, 1915. Serial No. 65,076.

*To all whom it may concern:*

Be it known that I, WALTER P. EVANS, a citizen of the United States, and resident of Des Moines, in the county of Polk and State of Iowa, have invented a new and useful Automatic Automobile-Jack, of which the following is a specification.

My present invention relates to jacks adapted for placement in garages and onto which an automobile may be run, its own power operating the jack to raise the car wheels free from the floor, in which position the car may rest for any desired length of time, for storage or for repairs.

The principal advantages attained by the use of my invention will later herein be summarized.

The principal object of the invention is to generally improve the construction and to increase the utility, efficiency and safety of devices of this nature.

More specifically stated, one of the main objects of the invention is to provide a device the supporting legs of which are each independent of the others.

Another object is to provide a jack the coöperating elements of which yield when struck by the car, thus eliminating jars and consequent injury to the automobile.

A further object is to provide a jack onto which the car may be driven when approaching it at an angle.

A further object is to provide means for releasing the car from the jack and simultaneously imparting to it such impetus that it will run backward out of an ordinary garage.

A further object is to provide novel means for indirectly connecting the front and rear pairs of legs.

A still further object is to provide a jack of such nature that only about one-half the power required by former devices of like nature, is now required.

Minor objects will presently appear; some of these will be particularly pointed out and others obvious.

The invention consists, substantially, in the improvements herein described.

By way of example an automatic automobile jack constructed in accordance with the principles of my invention is illustrated in the accompanying drawings, in which:

Figure 1 is a perspective view; Fig. 2, a modification of one of the legs; Fig. 3, a perspective detail of one of the brackets in which the front legs are mounted; and Fig. 4, a side elevation, illustrating the general manner of operation.

Considering the drawings in detail, and referring to each element and, where necessary, to each part thereof, by an identifying numeral, uniformly employed, 2 designates a garage floor on which are secured approach blocks 3.

4 indicates a bracket having upstanding parallel cheeks 6, 6' provided with registering seats 7 for the trunnions 8 of the foot member 9 of the main or operating leg 10 of the jack. A lock-and-release lever 11 having a hook 12 is pivoted at 13 to one of said cheeks, and said hook is adapted to engage a boss 14 on said leg. Both sides of the legs are channeled at its upper end and provided with apertures 15 selectively adapted for the reception of a pin 16 which projects also through the bifurcated ends of the head 17 of the leg. The upper end of said head is shown as a fork between the members $a$, $b$ of which the front axle of an automobile is adapted to rest. 18, 18 designate removable pins for retaining the trunnions 8 in their seats. 19 indicates a clevis, and 20 a ring secured thereto. 21 designates a screw threaded into an aperture in a projection 22 extending between and rearwardly from the cheeks 6, 6' and adapted to be adjusted therein whereby to regulate or limit the rearward movement of the leg, in rear of which the screw-head projects. The other front leg, 10' and bracket 4' are (excepting that there is no lever 11 and no means for mounting it or for engaging it with the leg), substantially duplicates of the leg 10 and bracket 4, and the parts thereof are numbered likewise.

Engaging each ring 20 is one end of a chain 23 the other end of which engages the loop end of a split link 24 the ends 25 of the arms of which are outturned. 26, 26 indicate like links, the loop end of each of which engages an eye 27 secured in the floor 2. Each coacting pair of said links 24, 26 passes through a compression-spring 28, their outturned ends engaging its opposite ends and each coacting pair of links and the connected spring forming a spring-clevis.

The brackets which support the rear pair of legs comprise each a base 30, upstanding parallel cheeks 31 having registering seats 32, and a centrally arranged rearward projection 33. Each is suitably secured to the floor 2 as indicated at 34. The foot member 35 of each leg 36 is provided near its lower end with trunnions 37 mounted in said seats and held therein by pins 57.

38 indicates the head-member of each leg 36 and has a saw-tooth face which confronts and engages the similar face of the foot 35. Each head 38 is provided with a longitudinally arranged slot 39 through which a bolt 40 passes, said bolt engaging a threaded aperture in the coacting foot. The upper portion of each head 38 is preferably a fork the points of which are indicated by $c$, $d$, and at the base of each point $d$ is a recess $e$ for a purpose presently described.

41 indicates the rear axle of an automobile of which 42 indicates the left hand rear wheel and 43 the truss rod.

44 designates a crank oscillatorily secured on the floor 2 by a bracket 45. Its weight arm is indicated by 46 and its power arm by 47. A link 48, the transversely arranged eye of which is engaged by the crank-arm 46, is engaged at its rear, apertured end by the threaded end of a wheel-base-adjusting rod 49 the rear portion of which passes through an eye in a clip 50, and said clip is adapted for adjustments longitudinally of said rod by means of a set-screw 51. The clip 50 is provided with an eye which receives the transversely arranged arm of a leg-elevating loop 53 the inwardly bent terminals 54 of which engage registering eyes in the parallel projections 33.

The rear pair of legs may be constructed like the leg 10′ or in any other suitable and preferred manner.

While it is desirable to make the legs adjustable, in order to operate on cars the axles of which differ in their distances from the floor, yet it is preferable in some instances to make a special jack for a special make of car, and in such event it is preferred that the supporting legs be non-adjustable. One type of such I have shown in Fig. 2, wherein $10^a$ represents the leg, $8^a$ the trunnions, and $14^a$ the boss—the latter used only on the main leg, indicated by 10.

Assume the legs to be in the relative positions shown by full lines in Fig. 4. The front axle of the approaching car will pass over the legs 36 and the left front wheel will strike the crank-arm 47 and carry it forward, thus acting—through the medium of the crank-arm 46, link 48, and clip 50, to draw the loop 53 forward and against the rear pair of legs, which will swing on their trunnions 37, the arm 47 in this movement having been carried to its full forward extent, and resting on the floor, but no wheel being as yet raised therefrom. As the car progresses the front axle will pass over the points $b$ and strike the points $a$, carrying the legs 10, 10′ forward and drawing the links 24,—26 apart to compress the springs 28, thus relieving or absorbing the shock which would occur were not some resilient means provided for this purpose. As the car was moving forward as last described its rear wheels were traveling on the approach blocks 3. Instantly upon said wheels leaving the blocks the rear axle will pass smoothly into the fork $c$, $d$, and the forward movement of the car will, by reason of the pressure of the rear axle against the points $c$, draw the legs 36 into substantially vertical positions, which, of course, are their highest ones. The front legs meanwhile will have assumed like positions, not, however, it is probable, until the car has carried them slightly past the vertical, in which event the springs instantly return them thereto.

It will be noted that the boss 14 is so positioned that when the parts are loose it lies just over and partly in rear of the arciform point of the lever. Therefore, as the boss moves forward, it will strike and depress the hook, and when it has passed it the gravity of the power arm of the latch or lever 11 will cause the hook 12 to engage the boss, thus locking the leg 10 in substantially vertical position, as indicated in Fig. 1. Inasmuch as the front axle is thus held from front or rear movement, the chassis will hold the rear axle in like manner.

Assume the car to be sustained entirely by the legs as above described. To release it the operator will raise the power arm of the latch lever 11 to thus free the hook 12 from the boss 14. The springs 18 being thus freed will expend their stored energy and, drawing on the legs 10, 10′, will give a rearward impulse to the car, the axles of which will throw all the legs likewise. The movement of the front pair is limited by the screws 21 and that of the rear ones by the loop 53, the movement of which is limited by reason of one of the arms of the crank 44 striking a stop-block 55.

The truss-rods of cars having them will not be injured, for the rear legs advance simultaneously with the rear axle and the fork-point $d$ will pass beneath said axle and said rod and will rest in the recesses $e$ in the rear of the legs, even though the latter be carried past their vertical positions and are then swung back by the axle resting thereon.

Should the front wheels of the car be nonparallel with the rear ones as the car starts onto the jack, it will make no difference in the result, inasmuch as each leg is absolutely independent of the others.

Inasmuch as the inclination of the front legs must necessarily be adjusted, (in order that cars the front axles of which differ in distance from the floor may be raised successfully), I provide the screw 21, by adjustments of which the point $a$ of the legs 10, 10, (which is the point to be struck by the front axle), and the point $b$ thereof, (which is the one passed over thereby) may quickly be regulated. The front legs are adjustable in height by means of the bolts or pins 16, and the rear ones by means of the bolts 40. Either front or rear pair of legs may be adjusted to different distances apart, the rear pair sliding on the extended ends 54 of the loop 43. The rear pair may be adjusted toward or from the front one by sliding the clip 50 on the rod 49, and locking thereof may be quickly effected by means of the set-screw 51.

56 indicates a clevis secured to the lever 11. Any convenient arrangement of ropes and pulleys may be secured thereto to actuate said lever to free the car, the operator being therein or in rear thereof, thus obviating the necessity of going to the front of the car in order to release it.

In the use of the word "independent" herein I intend to convey the meaning that each jack may be moved independently of any other, and desire that such construction be placed thereon.

It will be evident that the arrangement of the yielding means connected with each front leg may be changed in any of the numerous ways which would suggest themselves to a skilled mechanic. In fact it is so evident that numerous structural changes may be made; that the arrangement of the parts may be varied; that some of the parts may be omitted; and that some may be used in jacks differing widely in construction from the one shown, that I have not deemed it necessary to encumber this specification and the accompanying drawings with modified forms.

Having described the general nature of my improvements and having shown and described a preferred embodiment thereof, I claim as new the following, namely:

1. In a device of the nature described, a plurality of normally inclined independent jacks arranged in front and rear pairs, each of said jacks adapted to engage the outer end portion of an automobile axle, a crank operable by the automobile in its advancing movement, and means operated by said crank whereby one pair of said legs is caused to swing forwardly.

2. In a device of the nature described, a plurality of independently movable coöperating fulcrumed jacks arranged in front and rear pairs, a crank-arm adapted for actuation by an approaching vehicle, a rod connected with said crank-arm, means for sustaining a pair of said jacks in an inclined position and for swinging them forwardly, and means for adjustably connecting said rod and the last recited element.

3. In a device of the character described, a plurality of independently movable fulcrumed jacks arranged in front and rear pairs, a crank-arm adapted for actuation by an approaching vehicle, a rod connected with said crank-arm, a clip slidably mounted on said rod, means for locking it in selective positions thereon, and jack-raising means connected with said clip.

4. In a device of the nature described, a plurality of independent brackets arranged in quadrangular form, normally inclined jacks fulcrumed one in each bracket and movable independently of each other, and means for locking one of said jacks in vertical position, said jacks adapted to co-act in elevating and sustaining a vehicle.

In witness whereof I hereunto subscribe my name this 29th day of November, 1915.

WALTER P. EVANS.

Copies of this patent may be obtained for five cents each, by addressing the "Commissioner of Patents, Washington, D. C."